Patented July 18, 1961

2,993,063
COCOA BUTTER SUBSTITUTE AND PROCESS OF MAKING SAME

William Godfrey Alsop, Summit, N.J., and Adam Carr Bell, Jackson Heights, N.Y., assignors to Colgate-Palmolive Company, New York, N.Y., a corporation of Delaware
No Drawing. Filed Dec. 17, 1956, Ser. No. 628,529
8 Claims. (Cl. 260—410.6)

The present invention relates to a novel diester of propylene glycol and mixed saturated and unsaturated higher fatty acids having properties suitable as a cocoa butter substitute and the like.

Cocoa butter is an article of commerce which has found extensive use in the food field, particularly confectionery, such as in the manufacture of chocolates. It has a variety of other uses also, such as in the manufacture of suppositories. The discovery of a satisfactory synthetic substitute or extender for cocoa butter would be of advantage in view of the variations in price, supply and properties of the natural product. The desired substitute should possess certain specific requirements in physical properties in order to be suitable as a cocoa butter substitute.

It has now been found that a higher fatty acid diester of propylene glycol, the higher fatty acyl radicals thereof being a mixture of oleyl and a saturated fatty acyl radical selected from the group consisting of palmitoyl and stearoyl radicals, may be prepared so as to be normally solid and possess a melting point up to 35° C., and suitable properties as a cocoa butter substitute. A preferred embodiment relates to such propylene glycol diester characterized by a melting point of about 30 to 35° C., its "snap" and good mold releasing properties, etc. Where reference is made to melting point, such determination is made in accordance with the U.S. Pharmacopeia (Class II) method for fats unless otherwise specified.

The desired properties are characteristic of the structure of the product as a whole and are not solely dependent upon either the character of the fatty acyl radicals or the propylene glycol portion of the product. The molar ratio of the oleic acid radicals to the said saturated fatty acid radicals in the propylene glycol di-ester is of significance in the obtention of a product having the desired properties. In general, it has been found that the molar ratio of the oleic acids to the said saturated fatty acids should be from about 0.06 to 0.66 for a satisfactory product, though it is preferred to use a molar ratio from about 0.1 to 0.2.

The propylene glycol diester may be produced in any suitable manner, such as by the reaction of a higher fatty acylating agent with propylene glycol or its ester, as hereinafter described. One particular method which is productive of a good yield and purity of the product is the reaction of the propylene glycol with the mixed higher fatty acids in the proper proportions. In general, the reaction is conducted using substantially stoichiometric amount of the reactants sufficient to produce the diesters. If desired, it is possible to use an excess of either reactant.

The reaction is conducted preferably in a substantially anhydrous medium under an atmosphere of an inert gas, such as carbon dioxide or nitrogen. The reaction mixture should be heated at elevated temperature sufficient to form the desired esterification product and liberate water, such as by the use of temperatures of about 100 to 300° C. In general, it is preferred to use refluxing temperatures of the order of 160 to 260° C. with the liberated water being vaporized from the reaction mixture. It is desirable to continue the reaction until the reaction product has a free fatty acid value of less than about 3%, preferably less than 1% by weight.

Another suitable method of preparation is the inter-esterification or trans-esterification of a mixture or blend of propylene glycol di-esters of individual or mixed fatty acids so as to rearrange the higher fatty acid groups and form the propylene glycol mixed diester having the specified molar ratio and the desired properties. In this manner it is possible to use as reactants the propylene glycol di-esters which do not have the proper characteristics individually, but which may be integrated by randomization of the fatty acid radicals so as to form a product with the proper characteristics. These di-esters should be blended in the reaction mixture so that the resulting product has the desired ratio of said unsaturated and saturated fatty acid radicals.

This inter-esterification reaction may be conducted at any suitable temperature. It is preferred to use elevated temperatures, and usually about 100 to 300° C., in the presence of an alkaline catalyst in order to promote the rearrangement of the fatty acid radicals. Such inter-esterification catalysts are known, examples of which are sodium methylate, sodium hydroxide and potassium hydroxide. They are used usually in catalytic amounts such as up to about 1%, preferably .05–.5%, by weight.

In general, the product from either method of manufacture is finished or additionally refined so as to substantially eliminate or reduce any residual free fatty acid content below 3%, preferably less than about 1%, by weight. The reaction product from either esterification reaction may be subjected to any conventional means of further purification, if desired. The product may be refined by the usual treatment with alkali or acid refining, bleaching with fuller's earth and activated carbon, and further deodorized with steam in a vacuum.

The product of the instant invention is edible and possesses the desired characteristics as a cocoa butter substitute. Besides the melting characteristics, the product has a "snap" or brittleness, mold releasing properties, and usually is substantially odorless, relatively tasteless or has a bland taste, and a white to light tan color. To some extent, variations in the proportions within the indicated range of molar ratios of said unsaturated to saturated fatty acids may result in minor changes in the physical properties of the product such as melting point, "snap," etc. The particular or exact qualities most desired by each manufacturer for his specific use may be readily obtained by such variations in the molar ratio as described herein.

As illustrative of the specificity of the properties with respect to the character of the mixed propylene glycol di-ester, it has been found that the desired properties are not obtained by the use of a molar ratio significantly outside the indicated range. Similarly, a mixture of different propylene glycol di-esters of higher fatty acids, which individually do not possess the desired ratio but are so blended that the fatty acyl radicals are present in the desired ratio in the mixture and which does not exhibit the desired range of properties, may be so modified by inter-esterification that the reaction product possesses the properties required for a satisfactory cocoa butter substitute.

The fatty acid radicals in the mixed di-ester of the present invention may be derived from pure or commercial fatty acids, or mixtures thereof. In addition to the oleic, palmitic and stearic acid radicals, the product may contain minor amounts of other higher fatty acid radicals provided that they do not substantially adversely affect the desired properties. Examples are the acyl radicals of linoleic, linolenic, lauric and myristic acids which may be present in fractions of fatty acids derived from the natural fats and fatty oils, such as tallow, palm oil, cottonseed oil, and their hydrogenated derivatives and the like.

The following examples are further illustrative of the nature of the present invention and are not intended to limit the scope thereto. All amounts are by weight unless otherwise specified.

*Example I*

One mole of propylene glycol, 0.66 mole of edible oleic acid and 1.34 mole of edible vegetable palmitic acid containing 30% stearic acid (molar ratio of oleic to saturates is 0.5) are heated with continual stirring under an inert atmosphere of carbon dioxide at a temperature starting at 180° C. and increasing to 245° C. over a period of 12 hours. The resulting product is treated with steam to improve the odor and lower the amount of any free uncombined acid. The product is then successively heated with carbon black and bleaching earth particles to further improve the color of the product. The resulting propylene glycol mixed di-ester of oleic acid and said mixture of palmitic and stearic acid melts at about 33° C. This product has been tested and found to be suitable as a cocoa butter substitute.

*Example II*

A mixture of 1.7 moles of stearic acid, 0.3 mole of tallow fatty acids and 1.0 mole of propylene glycol is prepared and heated with stirring at reflux temperatures until the rate of reflux has practically ceased. The molar ratio of the oleic to palmitic and stearic acids is about 0.15, the tallow fatty acids being calculated as 50% oleic acid, 30% palmitic acid and 20% stearic acid for convenience. The temperature of the mixture is slowly increased to 250-260° C. and the reaction continued for approximately 15 hours. The reaction is carried out under an atmosphere of carbon dioxide and the water liberated by the esterification reaction is removed continually by vaporization. The reaction is considered complete when a free acid value of less than 1% is obtained. The resulting product is purified as in Example I and is highly satisfactory in its physical properties for use as a cocoa butter substitute. This product melts at 32.8° C., possesses satisfactory "snap" and brittleness, no odor, a bland taste and a white to white-grey color.

*Example III*

30 parts of the oleic acid di-ester of propylene glycol and 70 parts of the palmitic acid di-ester of propylene glycol are mixed with heating sufficient to form a uniform mixture. The molar ratio of oleic to the saturated fatty acids is 0.5. In order to inter-esterify this blend, 0.1% of sodium methylate is added and the mixture is heated at 240 to 250° C. for 10 minutes with constant stirring. The resulting product has the characteristics of cocoa butter and a melting point of about 33° C. which is lower than the melting point of the blend prior to interesterification.

*Example IV*

The procedure of Example III is repeated using as the reactants 80 parts of propylene glycol di-stearate (prepared from double pressed stearic acid) and 20 parts of propylene glycol di-oleate. The molar ratio of oleic to the palmitic and stearic acids is 0.25. The product is a suitable cocoa butter substitute and has a melting point of about 34.5° C.

*Example V*

Following the procedure of Example IV but using 67 parts of said di-stearate and 33 parts of said di-oleate, a product is obtained having a melting point of about 32° C. and other cocoa butter characteristics.

*Example VI*

Following the procedure of Example III similar blends of propylene glycol di-stearate (prepared from double pressed stearic acid) and the propylene glycol di-ester of tallow fatty acids are inter-esterified and result in products having cocoa butter properties. The molar ratio of oleic to the palmitic and stearic acid is approximately 0.1. The table below lists the parts by weight of the stearate di-ester and the tallow diester with the melting point of the product after interesterification.

| Parts of di-ester of stearic acid | Parts of di-ester of tallow acids | Melting point of interesterified product, ° C. |
| --- | --- | --- |
| 84 | 16 | 32.8 |
| 83 | 17 | 32.8 |
| 82 | 18 | 32.7 |
| 81 | 19 | 32.5 |
| 80 | 20 | 32.5 |

Although the present invention has been described with reference to particular embodiments and example, it will be apparent to those skilled in the art that variations and modifications can be substituted therefore without departing from the principles and true spirit of the invention.

Having described the invention, what is desired to be secured by Letters Patent is:

1. As a cocoa butter substitute, a mixed higher fatty acid di-ester of propylene glycol, said higher fatty acyl radicals being a mixture of oleyl and a saturated fatty acyl radical selected from the group consisting of palmitoyl and stearoyl radicals in a molar ratio from about 0.06 to 0.66 of said oleyl to said saturated fatty acyl radical, said mixed di-ester having a melting point of about 30 to 35° C.

2. A cocoa butter substitute comprising a propylene glycol di-ester of mixed higher fatty acids comprising oleic acid, stearic acid and palmitic acid, the molar ratio of said oleic acid to said palmitic and stearic acids being from about 0.06 to 0.66, said di-ester having a melting point of about 30 to 35° C.

3. A process which comprises reacting a higher fatty acylating agent with a material selected from the group consisting of propylene glycol and its ester, the reaction mixture containing a mixture of oleic acid radicals and a saturated fatty acid radical selected from the group consisting of palmitic and stearic acid radicals, the molar ratio of oleic acid radical to said saturated fatty acid radicals being from about 0.06 to 0.66, and forming a normally-solid propylene glycol di-ester of said mixture of fatty acids having a melting point up to 35° C.

4. A process which comprises heating propylene glycol with a mixture of oleic acid and a saturated fatty acid selected from the group consisting of palmitic and stearic acids, the molar ratio of oleic acid to said saturated fatty acids being from about 0.06 to 0.66, and forming a normally-solid propylene glycol di-ester of said mixture of fatty acids having a melting point up to 35° C.

5. A process for preparing a propylene glycol di-ester of oleic acid and a saturated fatty acid selected from the group consisting of palmitic and stearic acids which comprises blending propylene glycol di-esters of higher fatty acids containing oleic acid radicals and said saturated fatty acids radicals so that the molar ratio of oleic acid to said saturated fatty acids is from about 0.06 to 0.66, heating the resulting mixture in the presence of an interesterification catalyst to form a normally-solid propylene glycol di-ester of said mixture of fatty acids having a melting point up to 35° C.

6. A mixed higher fatty acid di-ester of propylene glycol, the higher fatty acyl radicals thereof being a mixture of oleyl and a saturated fatty acyl radical selected from the group consisting of palmitoyl and stearoyl radicals in a molar ratio from about 0.06 to 0.66 of said oleyl to said saturated fatty acyl radicals and effective to form a normally solid di-ester having a melting point up to 35° C.

7. A mixed higher fatty acid di-ester of propylene glycol suitable as a cocoa butter substitute, the higher fatty acyl radicals thereof containing a mixture of oleyl, palmitoyl and stearoyl radicals in a molar ratio from about 0.06 to 0.66 of said oleyl to said saturated fatty acyl radicals and effective to form a di-ester having a melting point of about 32 to 33° C.

8. A mixed higher fatty acid di-ester of propylene glycol, the higher fatty acyl radicals thereof comprising a saturated fatty acyl radical selected from the group consisting of palmitoyl and stearoyl radicals, and sufficient tallow fatty acid radicals containing the oleyl radical to form a mixed di-ester having a molar ratio from about 0.06 to 0.66 of said oleyl to said fatty acyl radicals and a melting point of 30 to 35° C.

References Cited in the file of this patent

UNITED STATES PATENTS

| | | |
|---|---|---|
| 2,055,063 | Bird | Sept. 22, 1936 |
| 2,221,674 | Ellis | Nov. 12, 1940 |
| 2,924,528 | Barsky et al. | Feb. 9, 1960 |

OTHER REFERENCES

Journal of American Pharmaceutical Association, vol. 26, Scientific Edition, June 1937, pages 475 to 479 entitled, "A New Suppository Base" by John C. Bird.

Goldsmith: "Polyhydric Alcohol Esters of Fatty Acids," Chemical Reviews, vol. 33, No. 3, Dec. 1943, pages 258, 278, 324 and 327 relied on.

Industrial Oil and Fat Products by Alton E. Bailey, 1945, Interscience Publishers Incorporated, New York pages 434 and 435.